(No Model.)
P. LORD.
CAR BRAKE.
No. 248,048. Patented Oct. 11, 1881.
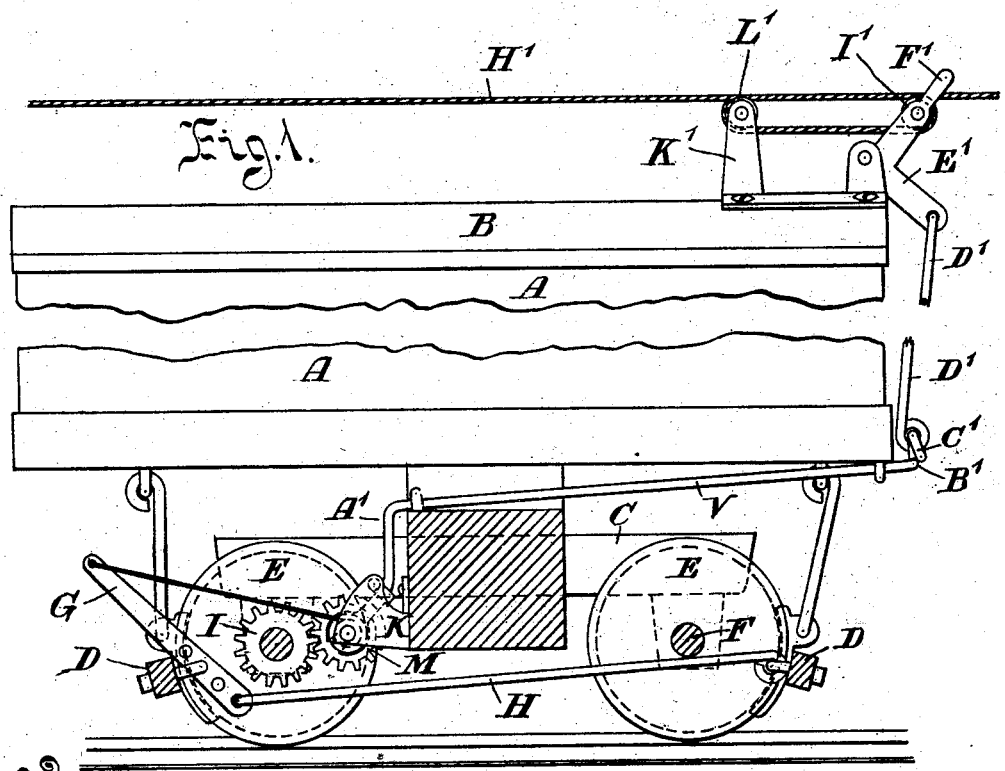
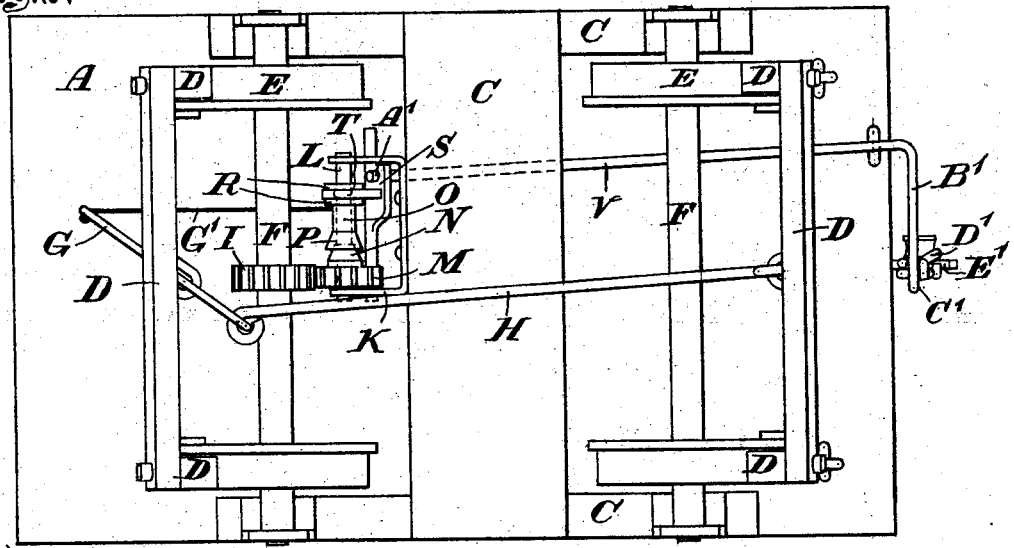
Witnesses:
Charles G. Simpson
Eusebe Mignault
Inventor.
Peter Lord

UNITED STATES PATENT OFFICE.

PETER LORD, OF MONTREAL, QUEBEC, CANADA, ASSIGNOR OF TWO-THIRDS TO EUSEBE MIGNAULT AND JEAN BAPTISTE VINET, OF SAME PLACE.

CAR-BRAKE.

SPECIFICATION forming part of Letters Patent No. 248,048, dated October 11, 1881.

Application filed August 22, 1881. (No model.)

*To all whom it may concern:*

Be it known that I, PETER LORD, of the city and district of Montreal, Province of Quebec, Canada, have invented certain new and useful Improvements in Railway-Car Brakes; and I do hereby declare that the following is a full, clear, and exact description of the same.

This invention has reference to the construction and arrangement of a cheap brake to be used on cars of railways, arranged so that the brakes may all be operated from either end of the train and obviate the necessity, at present existing in freight-trains, of having men travel over the top of the cars and apply the brakes separately. It also serves as a signal to the engine-driver in case of the train or a portion of it breaking loose.

In the drawings hereunto annexed similar letters of reference indicate like parts, and Figure 1 is a side elevation of a car embodying my invention, partly in section, and having the wheels removed from the front side to show the working parts. Fig. 2 is a plan of the car inverted.

A represents the body of the car, a portion only of which is shown. B is the cover or top, and C the truck; D, the brakes; E, the wheels, and F the axles, arranged substantially as those heretofore in use.

To one of the brakes D is attached the ordinary lever G, and to this lever a rod, H, so that by pulling on the lever the brakes are applied to the wheels in the ordinary manner; and my invention consists in the means that I am about to describe by which the lever G is operated.

On one of the axles F, as shown in the drawings, is secured a gear-wheel, I, and in a bracket, K, attached to the frame of the truck C, is carried an axle, L, having a gear-wheel, M, secured thereon. The axle L is provided with a conical male friction-bearing, N, which revolves with the gear-wheel M, upon an ordinary journal formed on the axle L, said axle being stationary. On the axle L is placed a thimble or cylinder, O, having at one end a conical friction-bearing, P, and at the other end flange R. This cylinder is made a free sliding fit on the axle L, and by sliding it in the direction to cause the friction-bearing P to be forced or pressed upon the male bearing N the cylinder O is caused to revolve with the axle F. By sliding cylinder O in the other direction to the position shown in Fig. 2 the said bearings are moved apart and the cylinder is released.

S is a slide, having its extensions carried in the bracket K, provided with an ordinary fork, T, placed between the flanges R, so that by moving the slide laterally with regard to the car the said bearings N and P will be brought into operation or separated. This is done by means of a rock-shaft, V, having an arm, A', the end of which comes through the slide S. The rock-shaft is carried, as shown, in ordinary bearings suitably situated. It extends beyond the end of the car, where it is provided with an arm, B', terminating in an eye, C', to which is attached a rod, D', connecting with a bell-crank, E', pivoted to the top of the car, so that by moving the handle or lever F' toward the car the bearings P and N will be operated in the manner above described.

Between the cylinder O and lever G is attached a chain or cord, G', so that when the said cylinder is caused to revolve it winds up the said chain or cord G' and causes the lever G to apply the brakes in the ordinary manner to the wheels, so that by supplying a bell-rope, H', extending the whole length of the train, and connecting it with the lever F' on each of the cars composing the train, the brakes of the whole train may be applied by hauling on the bell-rope H' at either end of the train.

The manner of connecting the bell-rope H' with the car is as follows: On the lever F' is pivoted a pulley, I', and on a projection, K', secured on the roof of the car, is pivoted a pulley, L', of about equal height with the pulley I'. Round these two pulleys a turn of the bell-rope is made, so that by pulling on the bell-rope from either end the pulley I' is drawn toward the pulley L'.

Each of the cars composing the train having been arranged as above described, the one end of the bell-rope H', I should prefer to attach to the gong in the cab of the engine drawing the train, and the other end will be made fast in the conductor's van at the tail end of the train, so that in case of any portion of the train breaking loose the strain that will necessarily fall on the bell-rope H' will first apply the brakes and afterward ring the bell in the cab of the engine, thereby notifying the engine-man of the disarrangement that has taken place.

It is not necessary that the invention should be applied to every car in the train, for should cars not having the invention be situated between those that have it the bell-rope will simply pass over those cars that have not and be attached to all those that have.

In case of desiring to apply the brakes to separate cars, this may be done by pulling by hand on the end of the lever F', to bring it toward a perpendicular position, and any desired means—such as a catch, &c.—may be employed for securing it in that position.

What I claim, and wish to secure by Letters Patent, is as follows:

1. The wheel E, axle F, having gear-wheel I secured thereon, in combination with the axle L, having gear-wheel M, provided with a male conical friction-bearing, N, revolving thereon, cylinder O, having metrical friction-bearing P, chain or cable G', lever G, and brake D, the whole constructed and operating substantially as described.

2. The wheels E, axles F, and gear I, in combination with the gear M, axle L, having friction-bearing N, cylinder O, having friction-bearing P, chain or cable G', lever G, brakes D, and with an operating mechanism, substantially as described, provided with pulley I', and car having pulley L' attached thereto, and bell-rope H', the whole constructed, arranged, and operating substantially as described.

PETER LORD.

Witnesses:
CHARLES G. C. SIMPSON,
EUSEBE MIGNAULT.